United States Patent
Mateti et al.

(10) Patent No.: US 9,602,203 B2
(45) Date of Patent: Mar. 21, 2017

(54) METHODS AND SYSTEMS FOR IDENTIFICATION AND COMMUNICATION USING FREE SPACE OPTICAL SYSTEMS INCLUDING WEARABLE SYSTEMS

(71) Applicant: The United States of America as represented by the Secretary of the Navy, Washington, DC (US)

(72) Inventors: Kiron Mateti, Bloomington, IN (US); Taylor Boyke, Gurnee, IL (US); Christopher Boyd, Bloomington, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 14/952,403

(22) Filed: Nov. 25, 2015

(65) Prior Publication Data

US 2016/0285551 A1    Sep. 29, 2016

Related U.S. Application Data

(60) Provisional application No. 62/137,536, filed on Mar. 24, 2015.

(51) Int. Cl.
    *H04B 10/00*    (2013.01)
    *H04B 10/112*   (2013.01)

(52) U.S. Cl.
    CPC ................ *H04B 10/1123* (2013.01)

(58) Field of Classification Search
    USPC ................................ 398/118–131
    See application file for complete search history.

(56) References Cited

U.S. PATENT DOCUMENTS

| | | | | |
|---|---|---|---|---|
| 3,277,303 A * | 10/1966 | Jensen | ............... | G02B 23/12 250/215 |
| 3,705,986 A * | 12/1972 | Sanders et al. | ....... | H04B 10/07 398/130 |
| 3,927,316 A * | 12/1975 | Citta | ............... | H04B 10/114 250/338.1 |
| 4,131,791 A * | 12/1978 | Lego, Jr. | ............ | G01S 17/74 349/1 |
| 4,249,265 A * | 2/1981 | Coester | ............. | G02B 26/04 342/45 |
| 4,603,975 A * | 8/1986 | Cinzori | ............. | G01B 11/272 356/141.3 |
| 4,648,131 A * | 3/1987 | Kawaguchi | .......... | A42B 3/30 2/410 |

(Continued)

*Primary Examiner* — Agustin Bello
(74) *Attorney, Agent, or Firm* — Christopher A. Monsey

(57) ABSTRACT

Methods and systems are provided for identifying entities and communicating using lightweight and wearable free space optical systems. A variety of optical and electronic elements are used to enable communications and identification in an environment where identification and communication must be accomplished to address a variety of constraints. Such constraints can include frequency congested environments or environments in which communication should be done using non radio frequency (RF) systems. Embodiments include converting data into optical signals that are transmitted using a laser which are received by optical receivers and converted into audio output.

14 Claims, 13 Drawing Sheets

(56) References Cited

U.S. PATENT DOCUMENTS

| | | | | |
|---|---|---|---|---|
| 4,814,769 A * | 3/1989 | Robin | G01S 17/74 | 342/45 |
| 4,823,401 A * | 4/1989 | Gammarino | F41G 3/2616 | 362/112 |
| 5,020,155 A * | 5/1991 | Griffin | H04B 10/1149 | 381/79 |
| 5,274,379 A * | 12/1993 | Carbonneau | H04B 10/2587 | 342/20 |
| 5,319,190 A * | 6/1994 | Allen | H04B 10/116 | 250/214 VT |
| 5,455,702 A * | 10/1995 | Reed | H04B 10/1143 | 398/129 |
| 5,648,862 A * | 7/1997 | Owen | H04B 10/11 | 342/45 |
| 5,686,722 A * | 11/1997 | Dubois | G01S 17/74 | 250/203.2 |
| 5,801,866 A * | 9/1998 | Chan | H04B 10/11 | 398/129 |
| 5,870,215 A * | 2/1999 | Milano | H04B 10/11 | 342/45 |
| 5,966,226 A * | 10/1999 | Gerber | F41G 3/2655 | 342/45 |
| 5,966,227 A * | 10/1999 | Dubois | G01S 17/74 | 342/45 |
| 5,999,299 A * | 12/1999 | Chan | H04B 10/11 | 398/130 |
| 6,097,330 A * | 8/2000 | Kiser | G01S 17/74 | 342/45 |
| 6,285,476 B1 * | 9/2001 | Carlson | H04B 10/40 | 398/9 |
| 6,493,123 B1 * | 12/2002 | Mansell | H04B 10/2587 | 342/45 |
| 6,893,346 B2 * | 5/2005 | Small | H04B 10/40 | 398/140 |
| 6,901,220 B1 * | 5/2005 | Carlson | H04B 10/43 | 398/118 |
| 7,338,375 B1 * | 3/2008 | Small | F41A 33/02 | 463/39 |
| 8,051,597 B1 * | 11/2011 | D'Souza | F41G 1/38 | 342/45 |
| 8,184,981 B2 * | 5/2012 | Ivtsenkov | A61B 5/6814 | 342/45 |
| 8,269,664 B2 * | 9/2012 | Daum | G01S 5/0009 | 342/44 |
| 8,301,032 B2 * | 10/2012 | Majumdar | G01S 17/74 | 398/129 |
| 8,531,114 B2 | 9/2013 | Deckard et al. | | |
| 8,837,949 B2 * | 9/2014 | Amadeo | H04B 10/1125 | 398/118 |
| 8,938,170 B2 * | 1/2015 | Gerber | H04B 10/1143 | 250/338.1 |
| 8,971,713 B2 * | 3/2015 | Gerber | H04B 10/1143 | 398/108 |
| 2007/0085725 A1 * | 4/2007 | Hayles | G01S 13/78 | 342/45 |
| 2009/0074422 A1 * | 3/2009 | Stewart | G01S 3/786 | 398/118 |
| 2009/0202254 A1 * | 8/2009 | Majumdar | G01S 17/74 | 398/140 |
| 2013/0064552 A1 * | 3/2013 | Fortune | H04B 10/116 | 398/132 |
| 2015/0256255 A1 * | 9/2015 | Stewart | G01S 3/786 | 398/129 |
| 2016/0285551 A1 * | 9/2016 | Mateti | H04B 10/1123 | |

* cited by examiner

METHODS AND SYSTEMS FOR IDENTIFICATION AND COMMUNICATION USING FREE SPACE OPTICAL SYSTEMS INCLUDING WEARABLE SYSTEMS

CROSS-REFERENCE TO RELATED APPLICATIONS

The present application claims priority to U.S. Provisional Patent Application Ser. No. 62/137,536, filed Mar. 24, 2015, entitled "METHODS AND SYSTEMS FOR IDENTIFICATION AND COMMUNICATION USING FREE SPACE OPTICAL SYSTEMS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,118) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to use of optical systems and optical data transfer in locations where RF is undesirable and/or unavailable. For example, such a location can be an area that has limitations on available spectrum or in areas where it is undesirable for another party, such as a cybercriminal, to detect and examine data transfers. Situations where existing technology is subject to too many devices operating in the same area, e.g., radar detectors being set off by other radio frequency (RF) or other electromagnetic radiation such as door opener sensors. In addition, areas where multiple systems and emitters are used for one purpose interfere with other receivers/emitters used for a different purpose. There also can be situations where use of an emitter can be hazardous such as hazards of electromagnetic radiation ordinance (HERO) situations. Another use can be with search and rescue teams such as a fire rescue team that is in a building where an exemplary embodiment can be added to an operator's equipment which can then be sent warnings, send communications such as a warning to or from an optical transceiver, and request for assistance (e.g., an emergency mode and type of emergency or request). A first responder or person in need of assistance can configure an embodiment of the invention to generate a distress code in response to an interrogation or illumination which conserves battery power and ensures that the system is seen by another first responder (or an aerial vehicle such as a drone with a surveillance camera system) when their vision or field of view (FOV) passes over the location where the optical transceiver is located. A multi-function user control can also be provided in addition to an automation system that can be configured to automatically respond to optical interrogation or illumination. An embodiment can also provide for an ability to alter a response to interrogation to include a voice message and/or text message that is sent in response to illumination in addition to another data such as a warning indicator which is sent to an interrogator as well as providing a warning to the user of the optical transceiver.

For example, there can be a situation where law enforcement can attempt to communicate through the use of short-wave radios. These short-wave radios give off RF signals that can be identified and located by criminals using, e.g., police scanners. Thus, it is necessary to implement methods of non-RF communication. As an alternative to short-wave radios, law enforcement (e.g., special weapons and training (SWAT) teams) can use infrared flashlights in combination with night vision goggles (NVG) to send signals and potentially short Morse code communications to other members of the team. This limits tactical planning, execution, and capabilities.

Law enforcement identification friend/foe (IFF) beacons can be designed for fratricide prevention to include designs that can be switched on and flash at various rates. Depending on a wavelength, these "always-on" modes increase the probability of detection by criminals. A more secure and protective method can include use of an interrogator that illuminates an operator's sector of fire, and if any friendly unit is in that illuminated region, the operator is notified by an automated flash in an appropriate wavelength for detection by the operator's visual augmentation equipment. RF communication can be encrypted but can be used to triangulate position, detect presence, and is susceptible to friendly/unfriendly jamming, interference, and requires stringent emissions control, as well as hazards of electromagnetic radiation ordinance.

One aspect of an embodiment can include optical technology comprising a common unit that can be triggered via a laser interrogation and which can also be used as an optical communication unit including audio and text. Exemplary embodiments can include a system enabling a "smart metering" or some sort of data collection system where a small unit is the communication transceiver. For example, if person has a light emitting diode (LED) trigger device that sends requests for data, an exemplary system receives the command and sends back the requested data. An operator can be provided with a suitable receiver to decode that transmitted data at a limited bandwidth.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
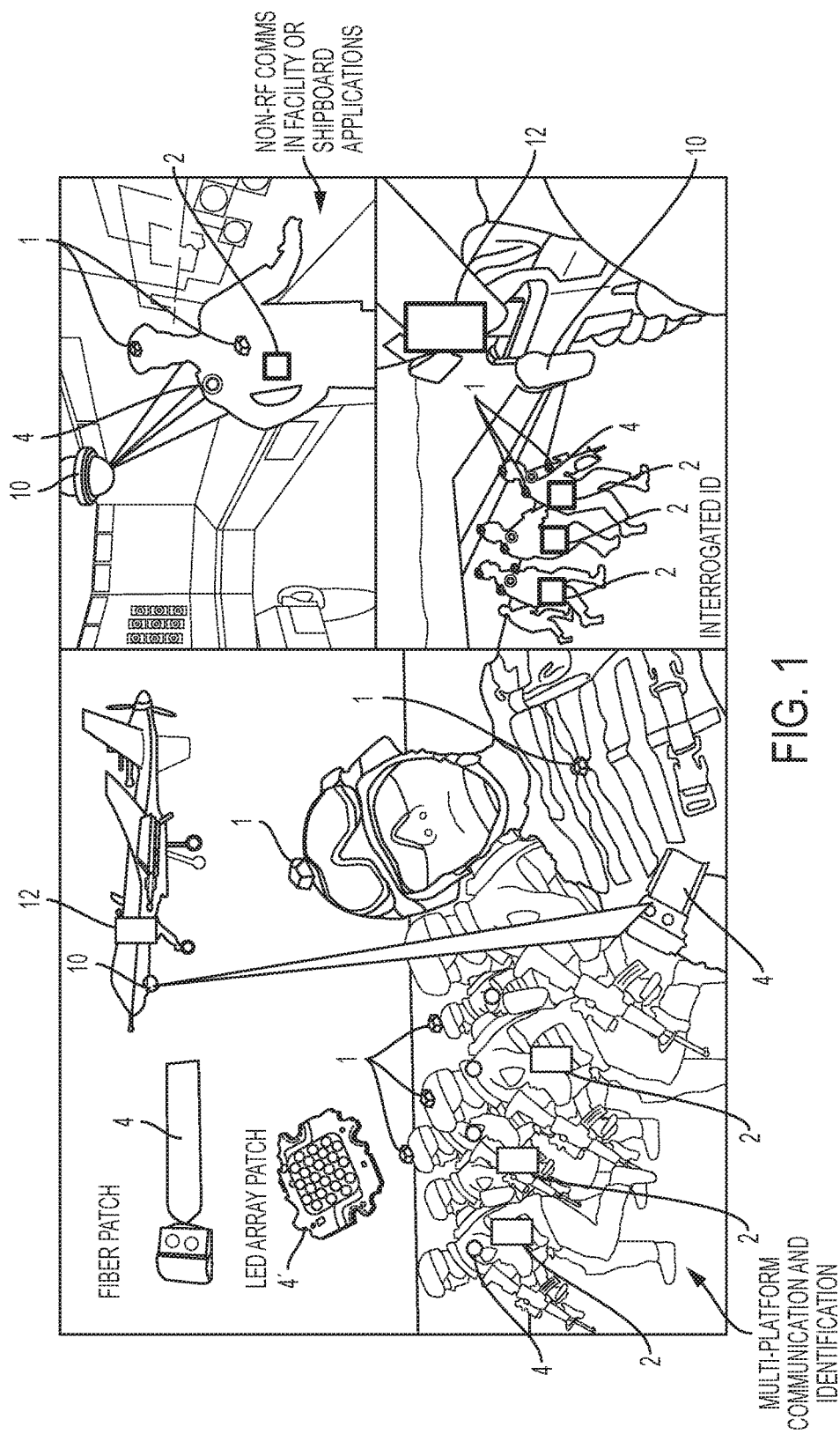
FIG. 1 shows an exemplary operational environment for various aspects of this disclosure

FIG. 1 shows an exemplary operational environment for several embodiments of this disclosure. Various embodiments of the invention can be used such as an identification only embodiment and an identification and communication embodiment. In an identification only embodiment, a first category of user/entity is equipped with a laser interrogator 10 that has an encoded output that is used to identify a second category of entity/users equipped with various exemplary LEROATs 2 including various MOTs 1 positioned on various parts of one or more of the second category of users/entity needing to be identified and/or communicated with, e.g. a forward operator. The first category user has an optical imager that detects a response signal from the MOT(s) 1. MOTs 1 are positioned on user helmets, backpacks, and chest areas. However, other mounting positions can be used in various combinations in accordance with different exemplary embodiments of the invention. Additional items shown include an alternative embodiment of a MOT 1 can include a fiber patch 4 that includes LEDs coupled to a plastic light leaky fiber that emits or scatters light (e.g., near infra-red spectrum) omni-directionally that can be configured into a strap that can be wrapped around a user's arm or attached to a user in a variety of locations. The fiber patch 4 is configured to operate in a same or similar way as an exemplary MOT 1 if it is configured with a receiver as well as its light transmission structures (e.g., LEDs). Another alternative embodiment for the MOT 1 can include a LED array patch 4' which can be attached to a user in various locations such as shown in FIG. 1 which also can be an alternate embodiment of the MOT 1 when it is also configured with a receiver such as described herein with respect to, e.g., FIGS. 2-8. A laser interrogator 10 is shown mounted on an equipment item (e.g., rifle or unmanned aerial vehicle (UAV) gimbal system which interacts with the various MOT embodiments. The FIG. 1 operational environments include several field settings and an internal facility setting with the laser interrogator 10 shown in a ceiling mount position within a control room which can be used for internal security tracking to determine if a person should or should not be in a particular location. An alternative embodiment can include use of an exemplary embodiment in a location where other forms of electromagnetic energy, e.g., radio frequency (RF), cannot be used such as an explosive environment.

Figure 2:
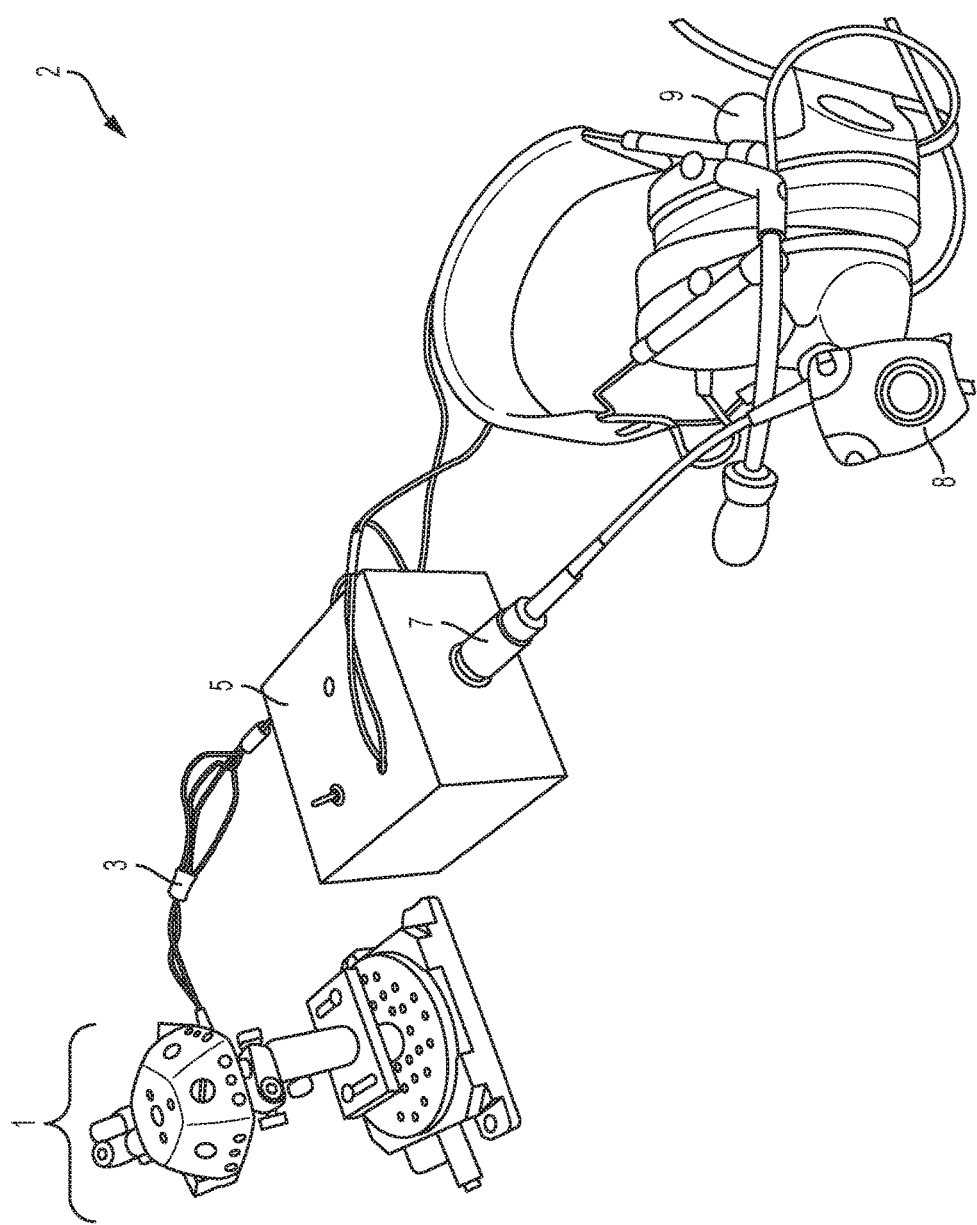
FIG. 2 shows an exemplary embodiment of a laser encoded receiver and optical audio transmitter (LEROAT) system.
Figure 2A:
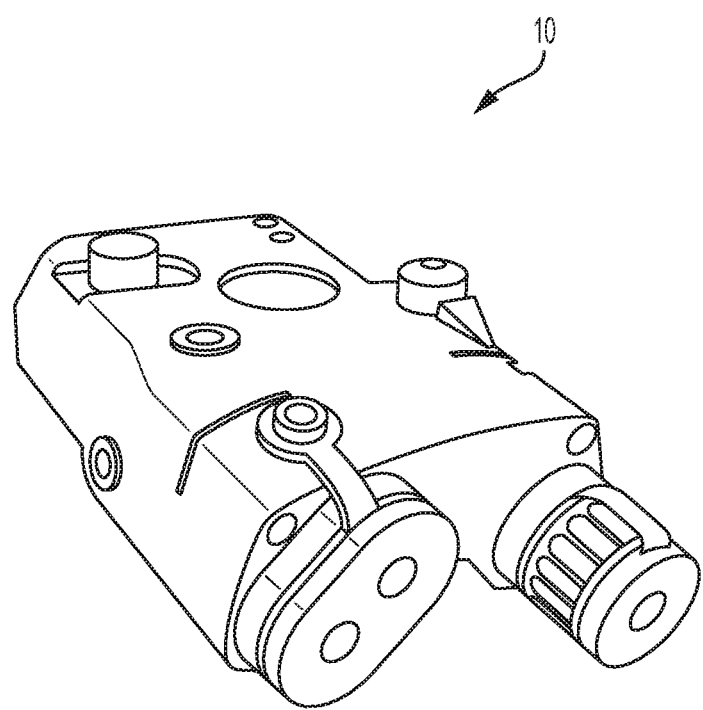
FIG. 2a shows an exemplary laser interrogator.

Referring to FIG. 2, an exemplary LEROAT 2 is shown including the MOT 1, a first interface cable 3, an electronics box 5 (e.g. see FIG. 4), an audio output and control cable 7, a headset 9 and a push-to-talk interface 8 coupled with the headset 9. FIG. 2a shows an exemplary laser interrogator 10 that is one example of a means that can be used to interact with the MOT 1 to trigger a desired response or trigger warning signal as well as communication activities. An embodiment of the laser interrogator 10 or another optical interrogative or illumination system can be positioned on, for example, a rifle or added to a binoculars, a surveillance camera, as well as fire hoses or rescue equipment, a helmet mounted system, etc. The exemplary MOT 1 can be positioned on a helmet (not shown), vehicle (not shown), or fixed site or location and then have wires connecting to it.

Figure 3:
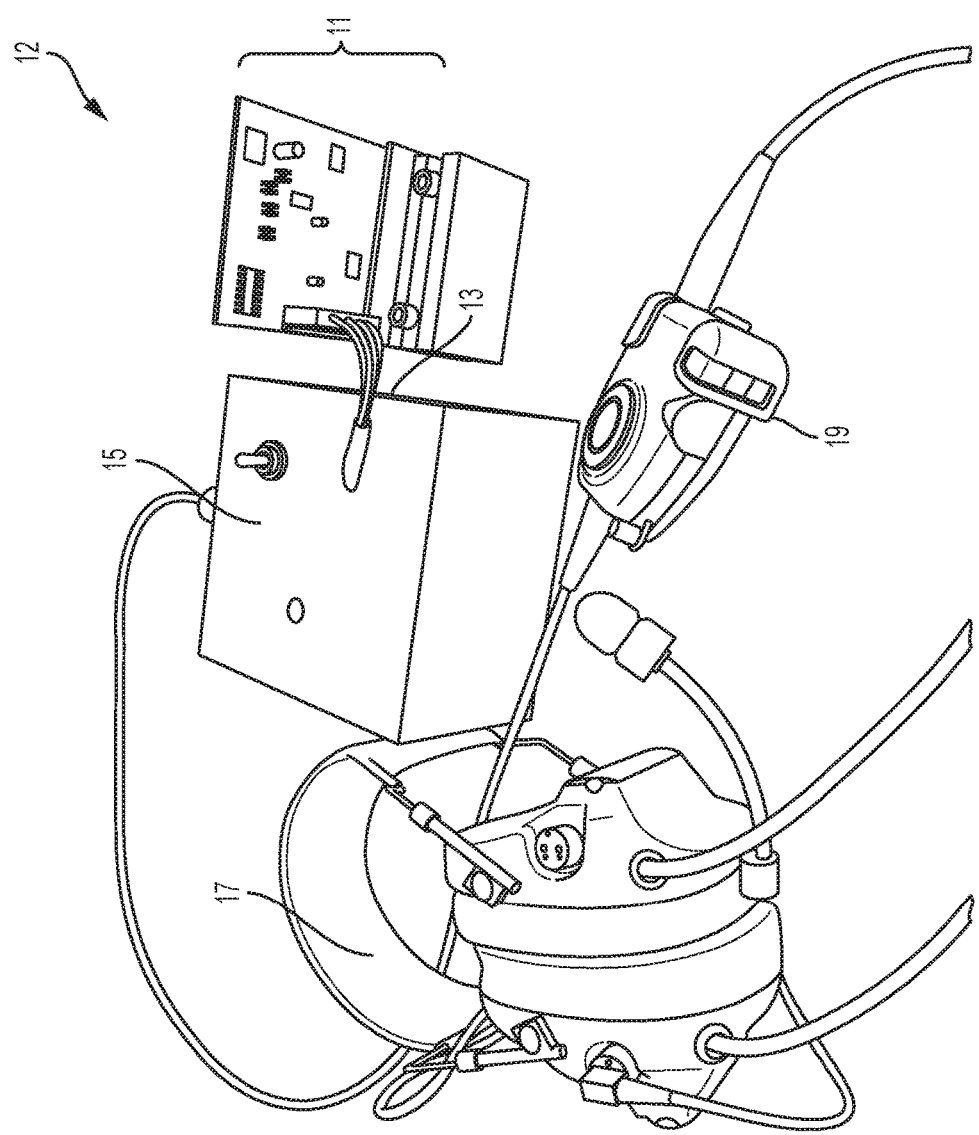
FIG. 3 shows an exemplary embodiment of an optical audio receiver (OAR)

FIG. 3 shows an exemplary OAR 12 including an exemplary photodetector circuit 11, a power/data photodiode interface cable 13, an electronics box 15 (e.g. see FIG. 5), a headset 17, and a push-to-talk device 19 coupled to the headset 17. The exemplary photodetector circuit 11 receives optical energy from the MOT 1, decodes the optical energy from the MOT 1 to produce a decoded signal, then converts the decoded signal to an audio signal, e.g., a beep/alarm, voice message, etc. The exemplary photodetector circuit 11 can also be configured to decode data from the optical energy from the MOT 1, which is then provided to a user interface such as a smartphone or other interface device (not shown).

Figure 4:
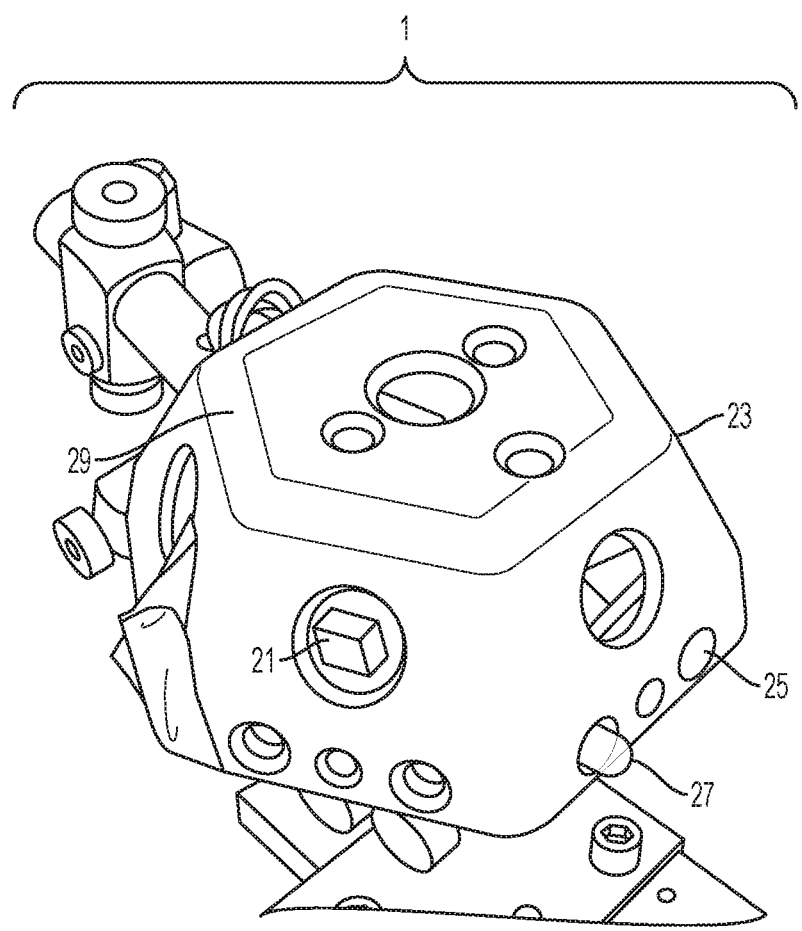
FIG. 4 shows an exemplary multifunctional optical transceiver (MOT)

FIG. 4 shows the exemplary MOT 1 including an enclosure 29, two infrared receivers 21, 23 configured to provide omnidirectional optical emission and reception from an optical illuminator (e.g., laser interrogator 10), and two LEDs 25, 27. The LEDs 25, 27 can be configured for operation and interface with the OAR 12 e.g., sending and receiving an optical audio signal to the OAR 12 photodetector circuit 11 for decoding and encoding.

Figure 5:
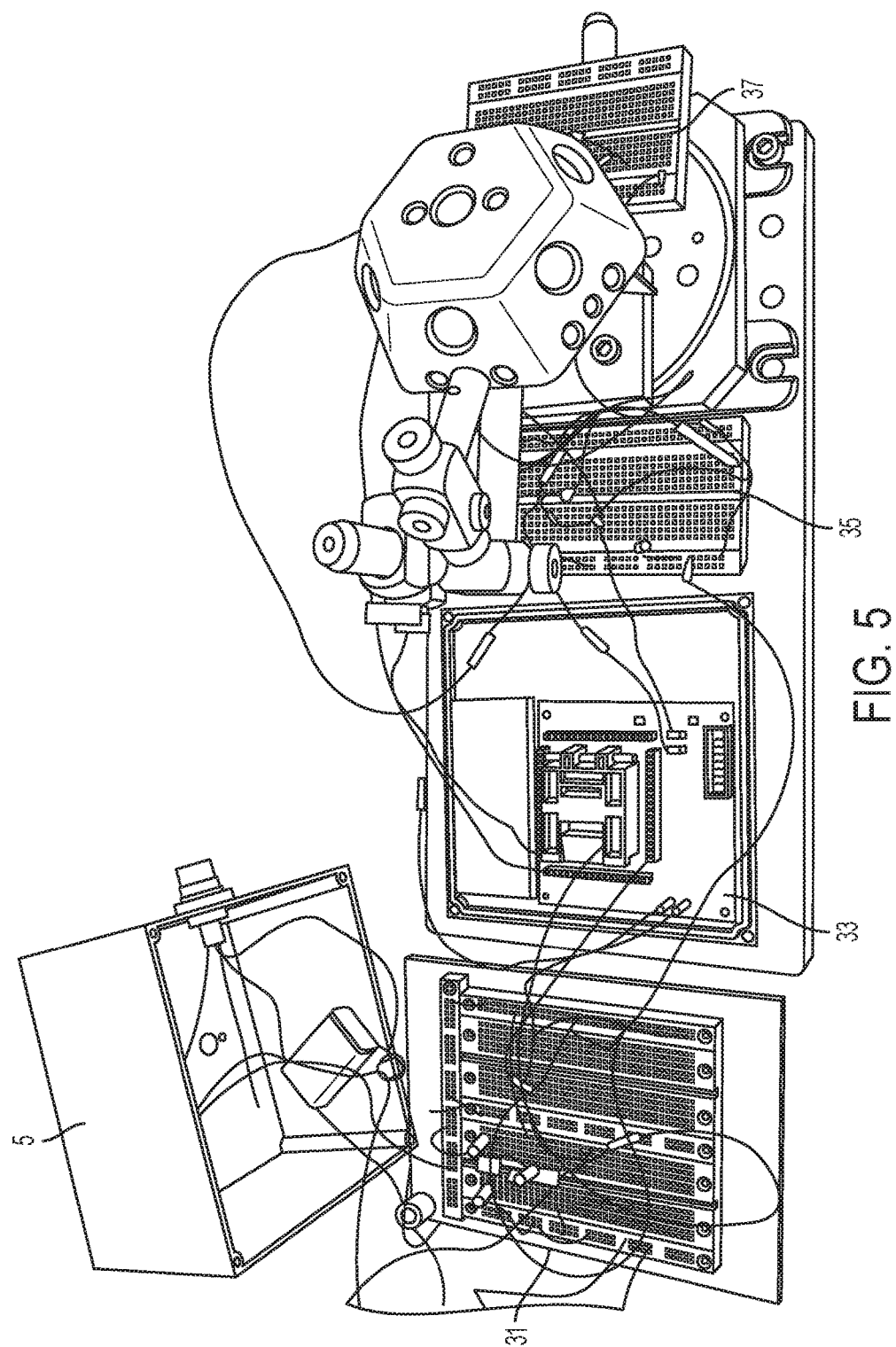
FIG. 5 shows an exemplary embodiment of electronic box components in a LEROAT.

FIG. 5 shows internal components of an exemplary electronics box 5 for the exemplary LEROAT 2. These exemplary components include an audio signal conditioner 31, a laser receiver microcontroller 33, an optical audio emitter driver 35, and a logical OR gate 37. The MOT 1 is connected to both the optical audio emitter driver 35 and the logical OR gate 37 to respectively operate the MOT 1; the logical OR gate 37 is connected with the two infrared receivers 21, 23 in order to be triggered by reception of optical energy by either of the two infrared receivers 21, 23. The optical audio emitter driver 35 sends an optical audio signal to LEDs 25, 27 for free space transmission or for transmission to the OAR 12. An embodiment provides an ability to simultaneously transmit data while sensing for an interrogation signal as an interrupt, which can be one aspect of an embodiment's function. Also, an embodiment of the invention includes a dual optical system to avoid, among other things, one optical system interfering with the other optical system. A laser can be modulated at one carrier frequency and the receivers can demodulate at a different carrier frequency to avoid interference. Using different wavelengths for the laser versus the receivers can also be implemented to avoid interference.

Figure 6:
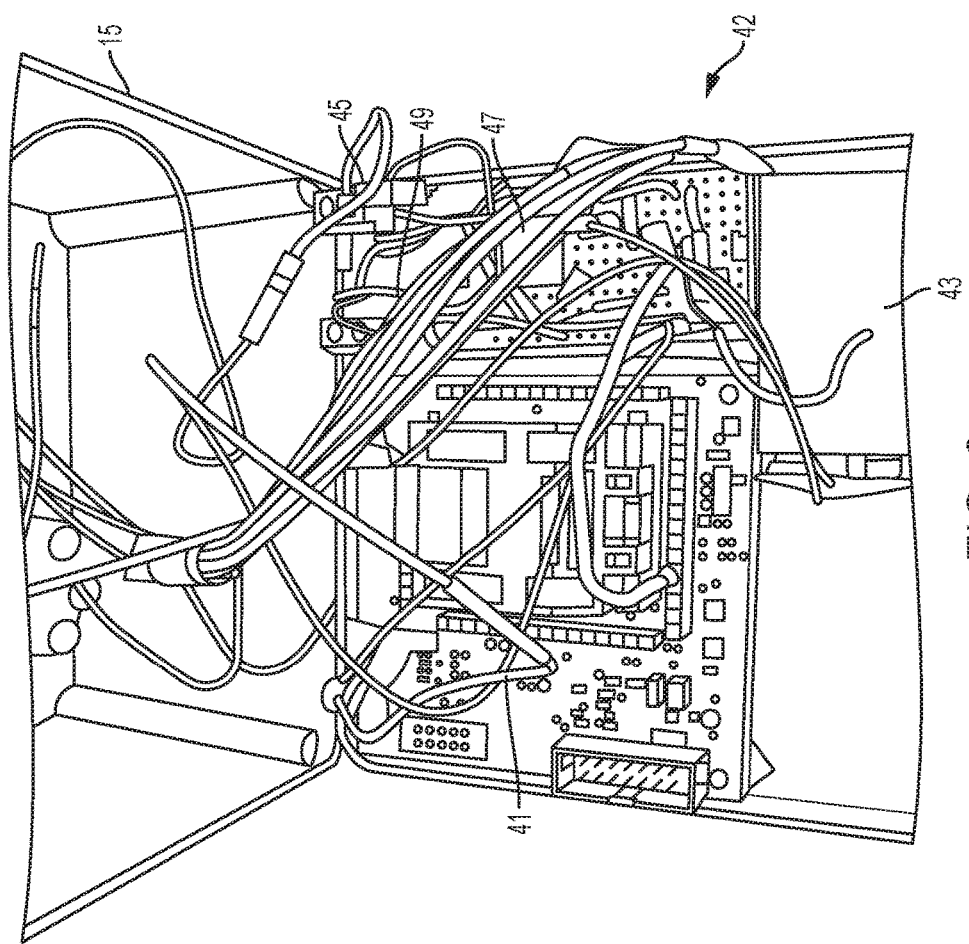
FIG. 6 shows an exemplary embodiment of electronic box components in an OAR.

FIG. 6 shows internal components of the exemplary electronics box 15 for the exemplary OAR 12. These exemplary components include an audio system microcontroller 41, a signal conditioning circuit 47, and a power conditioner 42 (see FIG. 8) including a battery 43, a voltage regulator 45, and a voltage converter 49. The signal from the photodetector circuit 11 can be received by the microcontroller 41 and then decoded and retransmitted to the signal conditioning circuit 47, which can be transmitted to the OAR 12 headset 17. An exemplary battery (e.g. 9V) provides power to the voltage regulator 45, the voltage converter 49, and the signal conditioning circuit 47, where the voltage converter 49 can provide power to the exemplary microcontroller 41, and the signal conditioning circuit 47.

Figure 7:
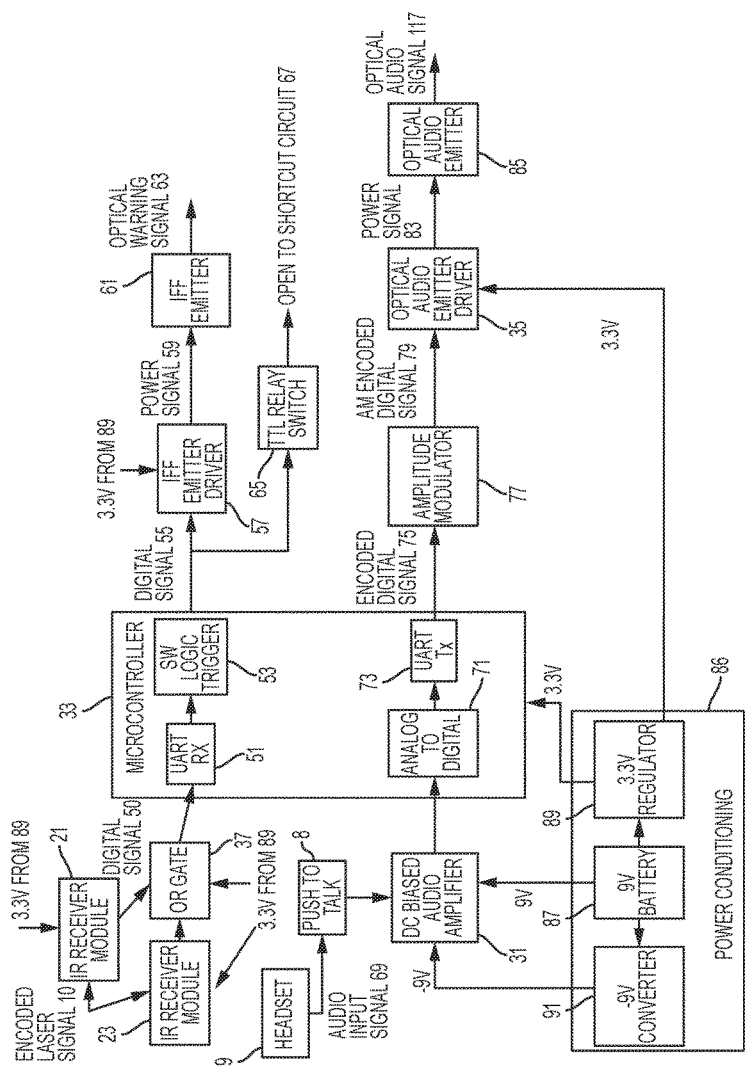
FIG. 7 shows an exemplary functional process diagram of a LEROAT.

FIG. 7 shows processing of an encoded laser signal from the laser interrogator 10 and an audio input signal 69 from the headset 17 using the laser receiver microcontroller 33.

The encoded laser signal can be received by either an infrared receiver module 21 and/or 23 and be processed through a logical OR gate 37 to produce a digital signal 50. The digital signal 50 can be fed into the exemplary laser receiver microcontroller 33 to a universal asynchronous receiver transmitter (UART) 51 for digital signal decoding. After decoding and comparing functions in software, a software (SW) logic trigger 53 can be activated and a digital signal 55 can be sent to an IFF emitter driver 57 which then sends a power signal 59 to an IFF emitter 61, which emits an optical warning signal 63 in a selected wavelength. Additionally and simultaneously, the headset 9 produces the audio input signal 69 via a push-to-talk interface 8 to a DC biased audio amplifier (e.g., audio signal conditioner 31) which can be sent to an analog-to-digital converter (ADC) 71 which can be a peripheral device in the laser receiver microcontroller 33. Software can encode, encrypt and send an encoded digital signal 75 through a second UART 73 to an amplitude modulator 77 which can modulate the encoded digital signal 75 by a carrier frequency. An AM encoded digital signal 79 can then be sent to the optical audio emitter driver 35 which sends a power signal 83 to an optical audio emitter 85 which sends optical energy containing information in the form of an optical audio signal 117. A power conditioner 86 is provided which includes a voltage converter 91, a battery 87, and a voltage regulator 89 which provides various power inputs to components including the DC Biased Audio Amplifier (e.g. audio signal conditioner) 31, the laser receiver microcontroller 33, and the optical audio emitter driver 35. A TTL Relay Switch 65 receives the digital signal 55 output from the laser receiver microcontroller 33 and outputs to an Open to Short Circuit 67.

Figure 8:
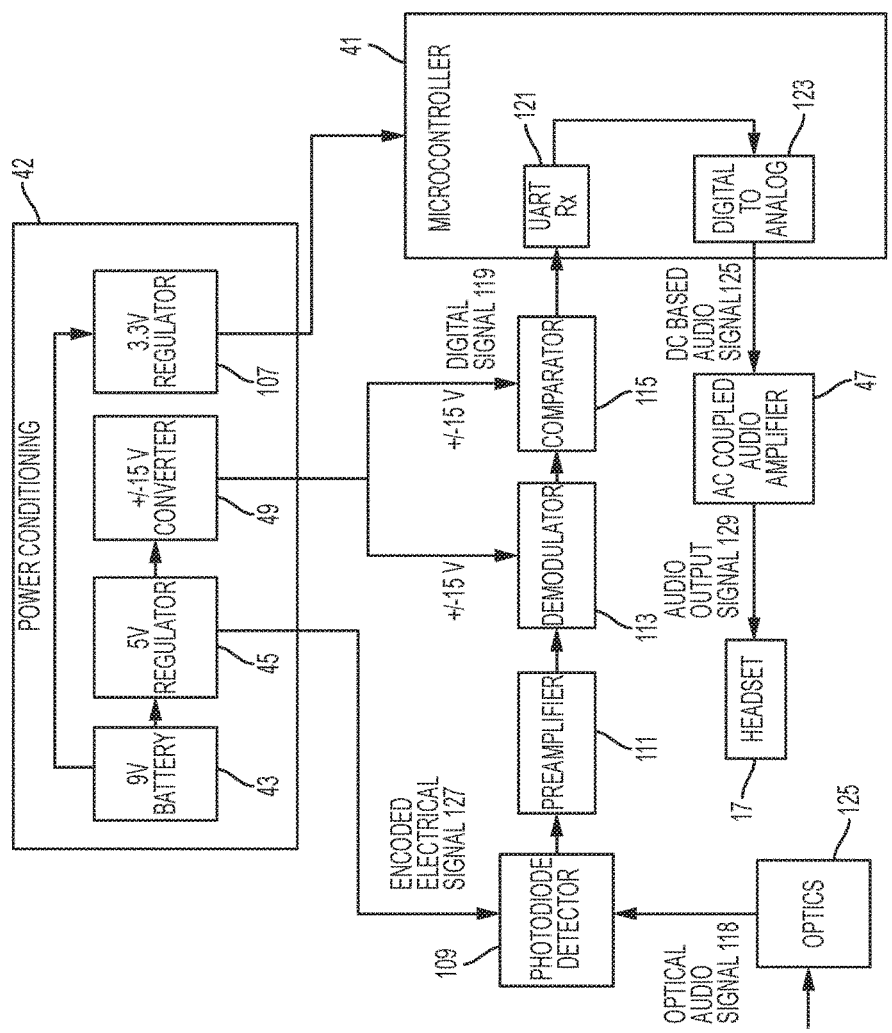
FIG. 8 shows an exemplary functional process diagram of an OAR.

FIG. 8 shows the audio system microcontroller 41 for processing an optical audio signal 118 to an audio output signal 129. The optical energy containing information in the form of the optical audio signal 118 can be collected through optics (e.g. a lens or a telescope) and focused onto a photodiode detector 109, which converts optical energy to a proportional electrical signal. An encoded electrical signal 127 can be amplified via a preamplifier 111, demodulated via a demodulator 113, and conditioned via a comparator 115, and sent as a digital signal 119 to the audio system microcontroller 41 via a third UART 121. Data can be decrypted and transmitted to a digital-to-analog converter (DAC) 123 as a DC biased audio signal 125. An AC coupled audio amplifier (e.g., signal conditioning circuit 47) can be used to create the audio output signal 129 that can be delivered to the OAR 12 headset 17. The power conditioner 42, including the battery 43, the voltage regulator 45 (coupled with the photodiode detector 109), and the voltage converter 49 (coupled to the demodulator 113 and the comparator 115) and a second voltage regulator 107, receives power from battery 43 and passes power to the audio system microcontroller 41.

Figure 9:
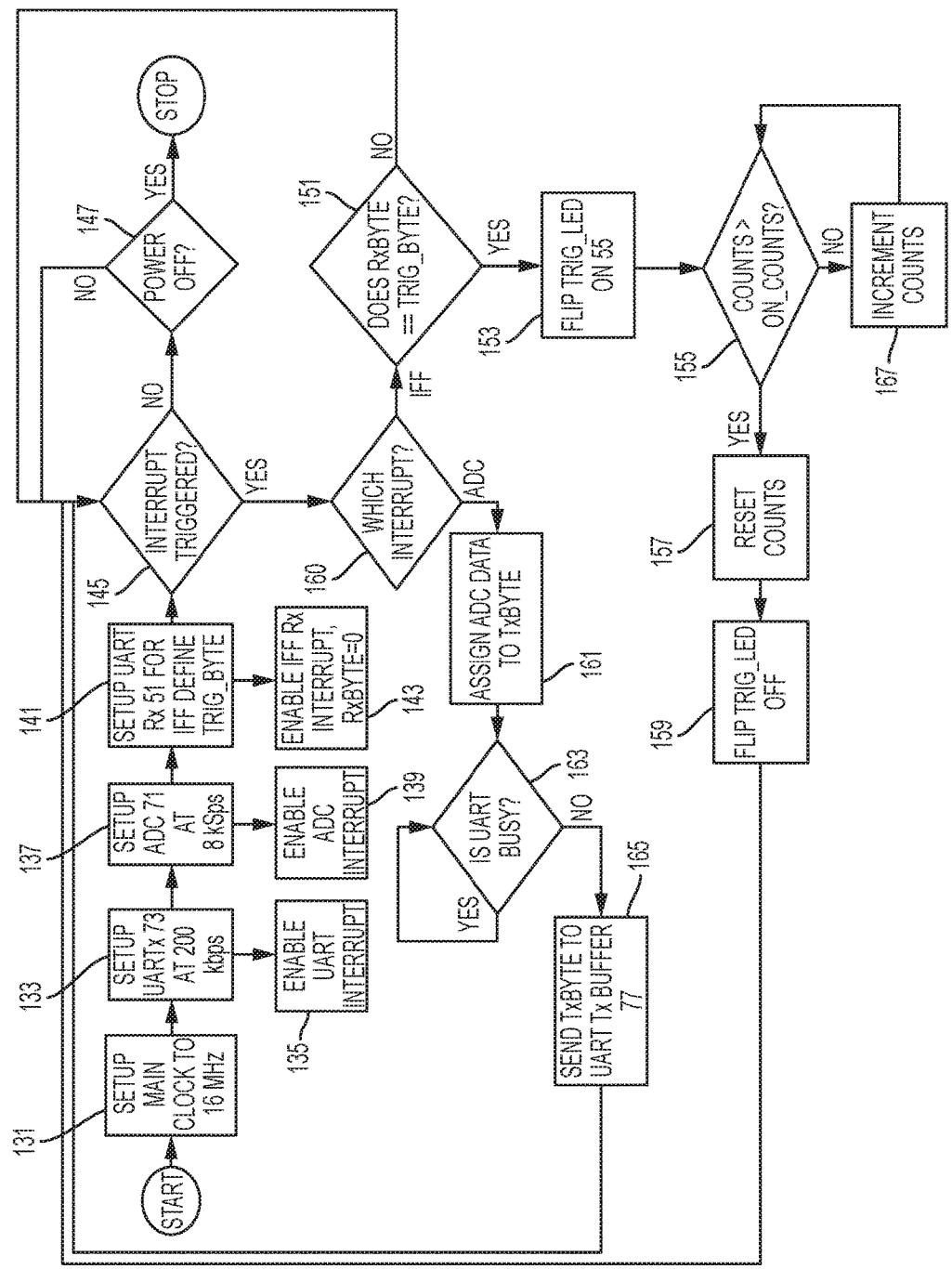
FIG. 9 shows a simplified diagram of an exemplary software system used with an exemplary LEROAT.

FIG. 9 shows an exemplary method of controlling or operating one embodiment of the LEROAT 2 system to receive an optical interrogation or optical illumination signal as an interrupt and simultaneously transmit optical audio or voice. At step 131, applying power and setting a system main clock frequency. At step 133, programming the second UART 73 for an exemplary data rate of 200 kilobits per second. At step 135, enabling the second UART 73 interrupts. At step 137, setting sample rate of the ADC 71 (e.g. at 8000 samples per second). At step 139, enabling ADC interrupts. At step 141, receiving and decoding an optical interrogation signal and/or optical illumination signal comprising an encoded waveform using the first UART 51 to a predefined or user-definable variable data structure or memory element (e.g. TRIG_BYTE) 141. At step 143, comparing the TRIG_BYTE variable or memory element data to the encoded waveform and enabling IFF receiver trigger interrupts. Next, the LEROAT 2 executes a loop that waits until either a removal of power at step 147 or an IFF response 159 and an associated interrupt trigger 145 (can be a software or hardware interrupt) occurs. At step 160, if the IFF response 159 has been triggered, then a received data byte, RxByte, is compared to the TRIG_BYTE 141 at a comparison step 151. If the comparison step 151 returns false, then no action occurs, and processing returns to the interrupt trigger 145 (a waiting condition), checking to determine if the interrupt trigger 145 has been set or triggered. If the comparison step 151 returns true, at step 153 the digital signal 55 configures a TRIG_LED pin high. The TRIG_LED pin remains in the high state until a user defined time period is exceeded using a count step 155 based on an increment variable Counts and a user-defined counter constant, ON_COUNTS. At step 167, the increment variable Counts can be incremented until it passes ON_COUNTS in the count step 155. At step 157 Counts is reset. At step 159, the TRIG_LED pin at the step 153 is reconfigured to a low state. Simultaneously, an interrupt from the ADC 71 can trigger the step 159 and data from the ADC buffer can be assigned to a TxByte 161. At step 165, the TxByte 161 can then be sent to through the second UART 73 to the amplitude modulator 77 after verifying that the second UART 73 peripheral is free by waiting in a UART trigger step 163.

Figure 10:
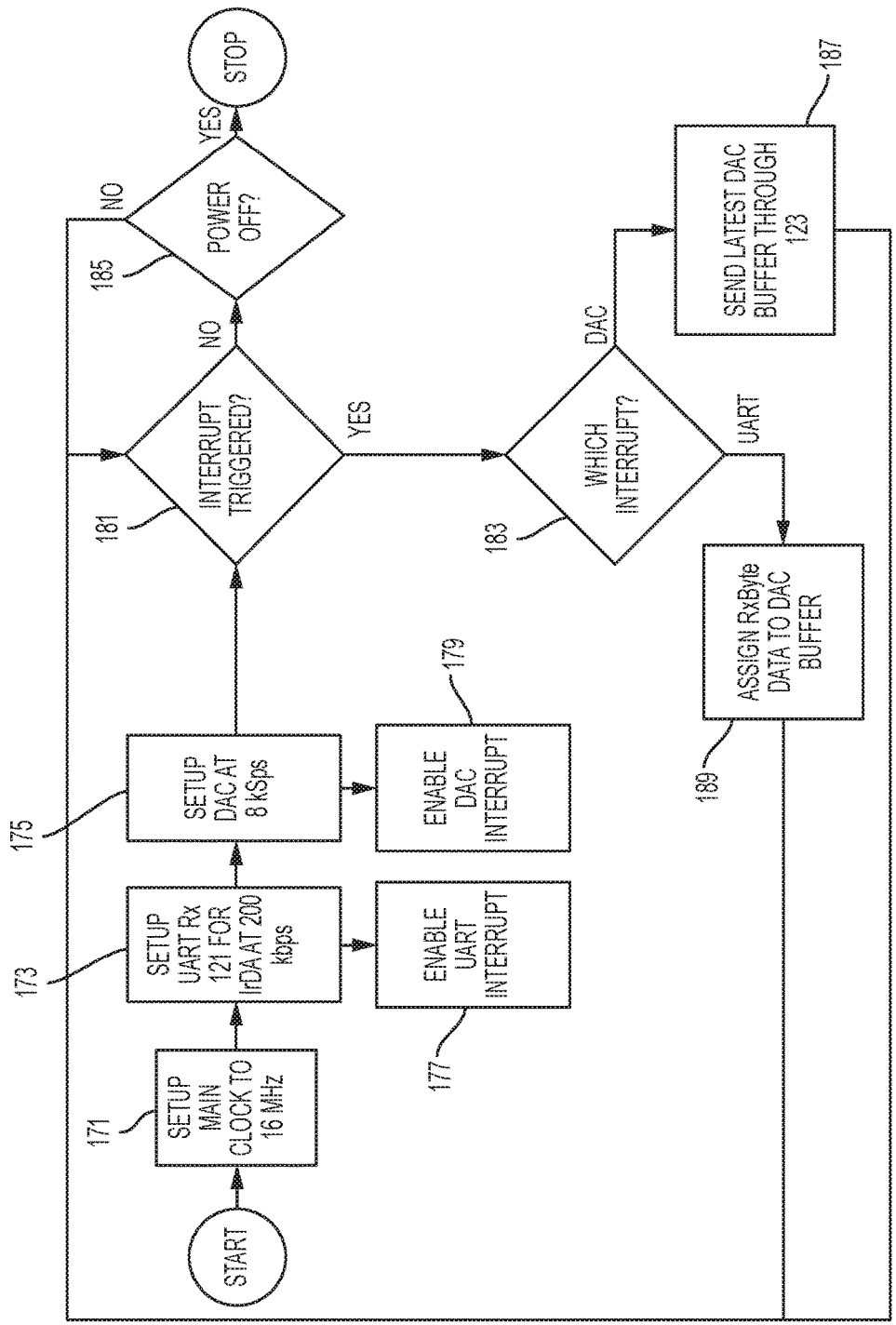
FIG. 10 shows a simplified diagram of an exemplary software system used with an exemplary OAR.

FIG. 10 shows a method of controlling one embodiment of the OAR 12 system where an exemplary microcontroller can be used to receive and decode an optical audio signal and reconstruct an audio signal to an exemplary headset. At step 171, once powered on, a system main clock frequency can be set. Next, at step 173 the third UART 121 can be programmed for an exemplary data rate of 200 kilobits per second, and at step 177, one or more UART interrupts can be enabled. At step 175, a DAC sample rate can be initialized, and at step 179, a DAC interrupts can be enabled. At step 181, the system waits for an interrupt to trigger or power off in step 185. In step 183, if the second UART 73 interrupt is triggered, in step 189 data passes to the DAC 123 buffer as an assigned variable RxByte which can be used to decrypt data. In step 183 if the DAC 123 interrupt is triggered, in step 187, the DAC 123 sends the DC biased audio signal 125.

Figure 11:
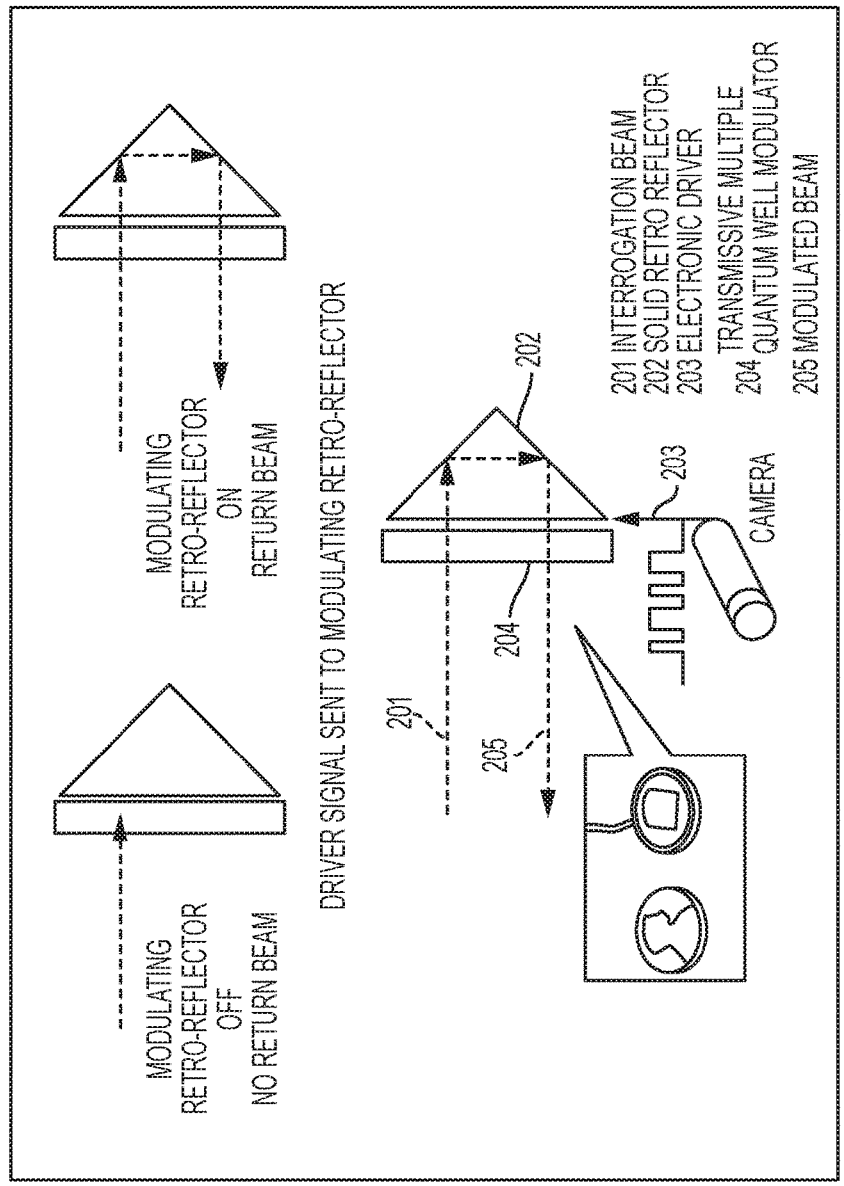
FIG. 11 shows an exemplary alternative embodiment with a modulating retro-reflector structure that can be used with an exemplary MOT and LEROAT.

FIG. 11 shows an exemplary alternative embodiment with a modulating retro-reflector structure that can be used with an exemplary MOT 1 and LEROAT 2. In this embodiment, a retro reflector 202 can be used to receive an incoming interrogation beam 201 and retro-reflect the incoming laser interrogation beam 201 into an outgoing modulated beam upon activation of elements within the retro-reflection, e.g., 202. One exemplary retro-reflection embodiment can include an electronic driver 203, a transmissive multiple structure 04, a quantum well modulator 204, which collectively output the modulated beam 205 upon input a modulation signal into the retro-reflector 202. In this embodiment, the retro-reflector 202 can narrow a field-of-emission and field of view (FOV) of the laser interrogator beam 202 to reduce omni-directional reflection or emission of the input laser interrogator beam 202. Various embodiments of a retro-reflector can be used to reduce required power output of a laser interrogator 10 and increase range or other operational characteristics of using the laser interrogator 10. Such a design can also reduce a light or electromagnetic signature of the MOT 1 or LEROAT 2 when the modulating retro-reflector is in an off position which then minimizes or eliminates a return beam from the laser interrogator's 10 beam 202 or other light source.

Figure 12:
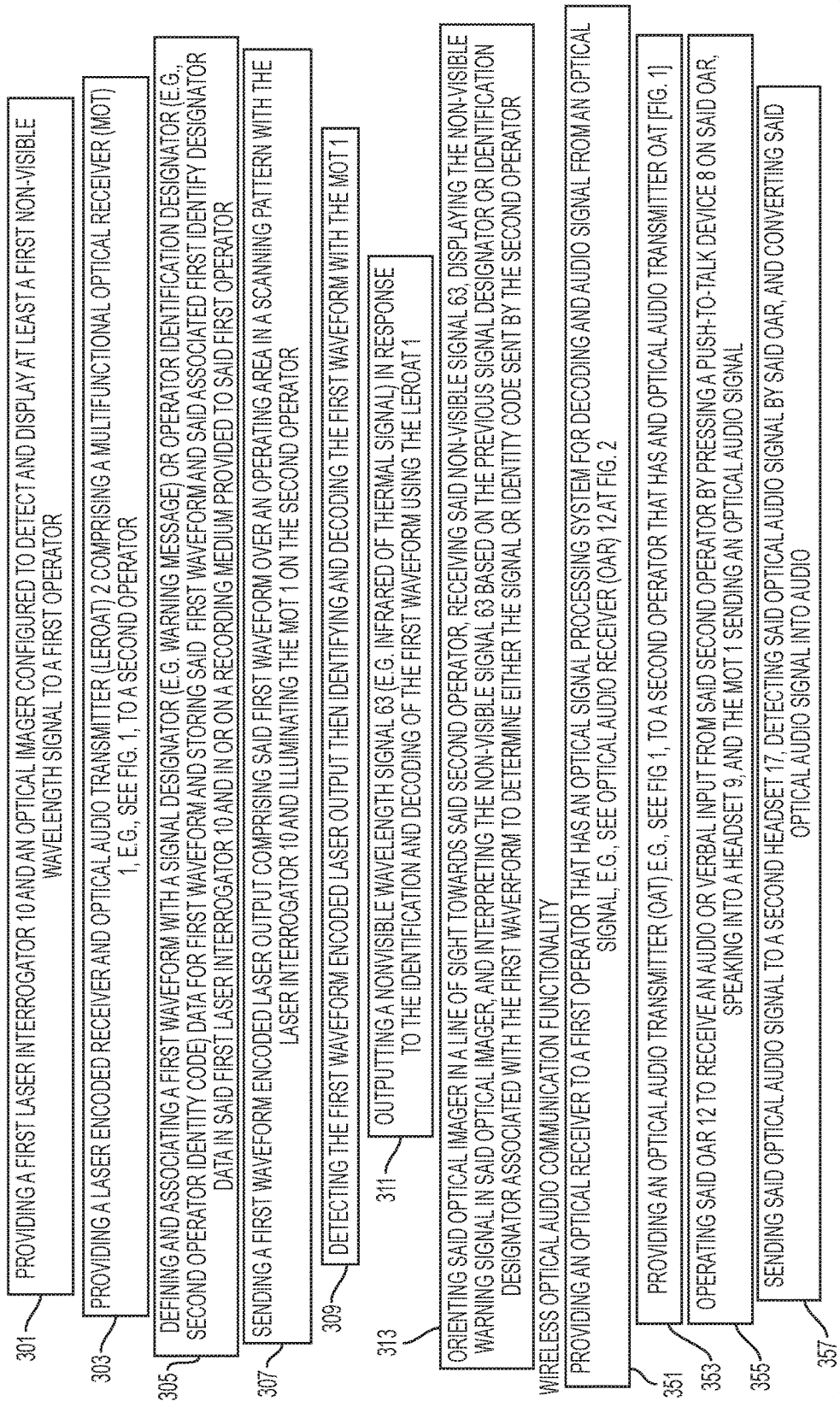
FIG. 12 shows an exemplary process flow diagram associated with an embodiment of the invention.

FIG. 12 shows an exemplary identification process using the LEROAT 2 and an exemplary communication functionality using the OAR 12. A first operator can perform a scanning pattern sweep of an operating area where a second operator is located with the laser interrogator 10. The MOT 1 on the second operator responds with the warning signal 63. This warning signal can be a beep, a saved voice file (e.g. name and unit number) or a short verbal message. The first operator receives the warning signal 63 with an optical receiver with an optical signal processing system for decoding the warning signal, such as a photodetector. The first operator can initiate two-way communication with the second operator via wireless optical audio signals. An exemplary design is that the first operator must be behind the second operator to receive a signal.

An embodiment of the invention can also include a case where it can be connected to a smart phone to send a text message or data using a RF system and/or other emitters in the smart phone such as a Bluetooth® system, a Wi-Fi® system, an infrared system, or a near field system engaging a near field transmitter.

Another embodiment can include adding a common operating picture (COP) capability which can include use of a global positioning system that can be transmitted over an optical connection between two operators that then displays on both operators' COP systems by a remote geo-position sensor. For example, an embodiment can use a laser rangefinder and a heading sensor (e.g., an inertial navigation system which determines true north based on a virtual inertial navigation system (INU)/inertial navigation system (INS), and aligning one of the INU/INS's three axis accelerometers with true north based on determining true north then calculating the difference between the true north a longitudinal line that the system passes through in a displaced path) which can then be used to plot locations transmitted over the optical connection. Once a range, position, and heading have been determined, then one or both operators' location can be transmitted optically and displayed on the COP without using RF or other systems. Such an embodiment can also be configured to update under certain conditions such as when the operators move more than a predetermined distance, in a particular direction, or in a set of directions. Directional and position limited updates can be used which updates and transmits in particular directions when operators reach predetermined locations.

Another exemplary embodiment process can include facilitating communication between a first and second operator using a wireless optical audio communication system, where the process comprises providing an optical interrogator to the first operator configured to generate a first optical output at a first wavelength, and an OAR and a first headset coupled with the OAR to the first operator, wherein the first operator dons the first headset, enabling them to hear an audio output from the first headset; providing a MOT and LEROAT with the second headset to the second operator configured to receive the first optical output, wherein the second operator dons the second headset, enabling them to hear an audio output from the second headset, and operating and scanning a line of sight operating area of interest by the first operator with the optical interrogator and illuminates the MOT with an encoded waveform signal on the second operator, and detecting the encoded waveform using the MOT on the second operator; triggering a response after the receipt of the encoded waveform by the MOT comprising activating the LEROAT to respond with a first data signal that includes text information comprising a warning data to the second operator on the headset, and transmitting a second optical output signal containing information including a second data signal to the first operator comprising a second data signal comprising a warning data; detecting the second optical output signal by the OAR by the first operator; and operating the OAR, wherein the OAR comprises having the second operator operate the MOT and LEROAT send a second optical output signal determining an identity of the second operator based on a third optical output signal containing information including an audio signal that can then be sent to the second headset and received by the first operator. Additionally, another exemplary embodiment with a position determination system and a COP can further include providing the position determination system that determines a position of the first and second operators; providing the COP graphical user interface system configured to show the position of the first and second operators; wherein the triggering a response further comprises operating the position determination system to determine the position of the first and second operators' LEROAT and OAR and communicating the first and second operators' positions encoded as a part of the first and second data that can then be displayed on the COP along with at least one identifier associated with the first and second operators. The COP can be configured to further display the position of the first and second operator with respect to each other along with the warning data.

Another alternative embodiment can include adding a biometric verification section which can take, for example, a voice sample that is generated in response to a challenge question and compares it to a library of audio samples to determine if the generated response first meets the proper challenge question response as well as a voice recognition system. In this way, biometric verification can be changed on a day-to-day basis and a recorded voice cannot be used to deceive an operator seeking to verify identity. This embodiment could include adding a processor or connecting a device such as a smart phone which can have voice recognition and a challenge question and answer response library. The additional embodiment can also have a security system to prevent access to the biometric system, and can further include a second biometric verification system e.g., voice, fingerprint, or password.

Although the invention has been described in detail with reference to certain preferred embodiments, variations and modifications exist within the spirit and scope of the invention as described and defined in the following claims.

The invention claimed is:

1. A method of identifying and communicating comprising:

providing a first optical interrogator to a first operator configured to generate a first optical output at a first wavelength comprising a first encoded waveform signal;

providing a first laser encoded receiver/optical audio transmitter (LEROAT) to a second operator configured to receive said first optical output, said first LEROAT comprising a first multifunctional optical transceiver (MOT), an electronics module, a first headset with a first speaker and a first microphone, wherein said first MOT comprises a plurality of first laser encoded receivers and a plurality of non-visible spectrum light emitting diodes (LEDs);

operating and orienting said first optical interrogator within a first line of sight operating area of interest by said first operator and illuminating said first MOT with said first encoded waveform signal;

detecting said first encoded waveform signal using said first MOT associated with said second operator;

triggering a first response after detection of said first encoded waveform signal by said first MOT comprising activating said first plurality of non-visible spectrum LEDs to respond with a first non-visible wavelength signal comprising an infrared or thermal warning signal;

detecting said first non-visible wavelength signal using a first optical imager by said first operator in said first line of sight of operating area of interest to receive said first non-visible wavelength signal; and determining an identity of said second operator based on said detecting of said first non-visible wavelength signal by associating said first non-visible wavelength signal with a predetermined list of operator identities comprising a plurality of identifiers and one of an associated plurality of non-visible wavelength signals.

2. A method as in claim 1, wherein said plurality of first laser encoded receivers comprise infrared or photodiode receivers.

3. A method as in claim 1, further comprising:

providing a first optical audio receiver (OAR) and a second headset to said first operator, said first OAR configured to convert a second optical output to a first audio signal output, said second headset comprising a second speaker, wherein said first operator dons said second headset to hear said first audio signal output;

operating and orienting said first optical interrogator within said first line of sight operating area of interest by said first operator and illuminating said first MOT with said first encoded waveform signal;

detecting said first encoded waveform signal using said first MOT;

generating a second audio signal output comprising a first audio warning signal audible to said second operator on said first headset, and transmitting said second optical output signal to said first operator;

detecting said second optical output signal by said first OAR by said first operator; and operating said first OAR to generate said first audio signal through said second headset.

4. A method as in claim 1, further comprising:

providing a first optical audio receiver (OAR) and a second headset coupled to said first OAR to said first operator, said first OAR configured to convert a second optical output to a first audio signal output, said second headset comprising a second speaker, wherein said first operator dons said second headset to hear said first audio signal output;

operating and orienting said first optical interrogator within said first line of sight operating area of interest by said first operator and illuminating said first MOT with said first encoded waveform signal;

detecting said first encoded waveform signal using said first MOT;

generating a second audio signal output comprising a first audio warning signal audible to said second operator on said first headset, and transmitting said second optical output signal to said first operator using said first MOT;

detecting said second optical output signal by said first OAR by said first operator; and operating said first OAR to generate said first audio signal through said second headset;

providing a second optical interrogator to said second operator configured to generate a third optical output at said first wavelength comprising a second encoded waveform signal, providing a second OAR coupled to said first headset to said second operator, said second OAR configured to convert a fourth optical output to a third audio signal output, wherein said second operator dons said first headset to hear said third audio signal output from said first headset;

providing a second MOT and second LEROAT coupled with said second headset to said first operator configured to receive said third optical output, wherein said first operator dons said second headset so as to be able to hear output from said second headset;

operating and scanning a second line of sight operating area of interest by said second operator with said second optical interrogator and illuminating said second MOT with said second encoded waveform signal on said first operator;

detecting said second encoded waveform signal using said second MOT on said first operator;

triggering a second response after receipt of said second encoded waveform signal by said second MOT comprising activating said second LEROAT to respond with a first data signal that includes text information comprising a warning data to said first operator, and transmitting a fourth optical output containing information including a second data signal to said second operator wherein said second data signal comprises said warning data;

detecting said fourth optical output by said OAR by said second operator; and operating said OAR, wherein said OAR comprises having said first operator operate said second MOT and LEROAT to send said fourth optical output determining said identity of said second operator based on said fourth optical output containing information including said third audio signal output sent to said first headset and received by said second operator;

displaying said text information on a display.

5. A method as in claim 4, further comprising:

providing a position determination system that determines a first and second operators' positions;

providing a common operating picture (COP) graphical user interface system configured to show said first and second operators' positions;

wherein said triggering said first response further comprises operating said position determination system to determine said first and second operators' positions and said first LEROAT and said OAR communicating said first and second operators' positions encoded as a part of said first and second data signals, and displaying on said COP along with at least one of said plurality of identifiers associated with said first and second operators, wherein said COP is configured to further display said first and second operators' positions with respect to each other along with said warning data.

6. A method as in claim 1, further comprising:

providing said first operator with an optical audio receiver (OAR) and a second headset coupled with said OAR, wherein said first operator dons said second headset;

operating said first LEROAT, wherein operating comprises having said second operator operate a switch on said LEROAT, speaking into said first headset that converts said first operator's words or verbal sounds into a first audio signal, and said LEROAT converts said first audio signal into an optical audio signal and transmits an optical audio signal to said OAR; and operating said OAR, wherein operating said OAR comprises said OAR detecting said optical audio signal and converting said optical audio signal to a second audio signal, and said second audio signal is then sent to said second headset and received by said first operator.

7. A method of identifying and communicating using free space optical systems comprising:

providing a first optical interrogator to a first operator configured to generate a first optical output at a first wavelength;

providing a first laser encoded receiver/optical audio transmitter (LEROAT) to a second operator configured to receive said first optical output, said first LEROAT comprising a first multifunctional optical transceiver (MOT), an electronics module, a first headset with a first speaker and a first microphone, said first MOT comprises a plurality of first laser encoded receivers and a plurality of non-visible spectrum light emitting diodes (LEDs);

operating and orienting said first optical interrogator within a first line of sight operating area of interest by said first operator and illuminating said first MOT with a first encoded waveform signal;

detecting said first encoded waveform signal using said first MOT donned by said second operator;

triggering a first response after detection of said first encoded waveform signal by said first MOT comprising activating said first plurality of non-visible spectrum LEDs to respond with a first non-visible wavelength signal comprising an infrared or thermal warning signal;

detecting said first non-visible wavelength signal using a first optical imager by said first operator in said first line of sight operating area of interest to receive said first non-visible wavelength signal;

determining an identity of said second operator based on said detecting of said first non-visible wavelength signal by associating said first non-visible wavelength signal with a predetermined list of operator identities comprising a plurality of identifiers and one of an associated plurality of non-visible wavelength signals;

generating said second audio signal output comprising a first audio warning signal audible to said second operator on said first headset, and transmitting a second optical output signal to said first operator after said operating and orienting said first optical interrogator within said first line of sight operating area of interest by said first operator and illuminating said first MOT with said first encoded waveform signal and said detecting said first encoded waveform signal using said first MOT;

detecting said second optical output signal by a first optical audio receiver (OAR) by said first operator; and operating said first OAR to generate a first audio signal through a second headset;

triggering a second response after receipt of said first encoded waveform signal by said first MOT comprising activating said first LEROAT to respond with a first data signal that includes text information comprising a warning data to said second operator, and transmitting said second optical output signal containing information including a second data signal to said first operator wherein said second data signal comprises said warning data;

providing a position determination system that determines a first and second operators' positions;

providing a common operating picture (COP) graphical user interface system configured to show said first and second operators' positions;

operating said position determination system to determine said first and second operators' positions, and said first LEROAT and said OAR and communicate said first and second operators' positions encoded as a part of said first and second data signals that is then displayed on said COP along with at least one identifier associated with said first and second operators, said COP is configured to further display said first and second operators' positions with respect to each other along with said warning data;

providing said second operator with an optical audio receiver (OAR) and said first headset that is coupled with said OAR, wherein said second operator dons said first headset to hear output from said first headset;

providing a second LEROAT to said first operator configured to receive said second optical output containing information including a second data signal to said first operator wherein said second data signal comprises said warning data, said second LEROAT comprising a second multifunctional optical transceiver (MOT), an electronics module, a second headset with a second speaker and a second microphone, said second MOT comprises a plurality of second laser encoded receivers and a plurality of non-visible spectrum light emitting diodes (LEDs);

operating said second LEROAT, wherein operating comprises having said first operator operate a switch on said second LEROAT, speaking into said second headset that converts said first operator's words or verbal sounds into a third audio signal, and said LEROAT converts said third audio signal into a second optical audio signal and transmits said second optical audio signal to said second OAR; and operating said second OAR, wherein operating said second OAR comprises said second OAR detecting said second optical audio signal and converting said second optical audio signal to a third audio signal, and said third audio signal is then sent to said first headset and received by said second operator.

8. A method as in claim 7, wherein said plurality of first laser encoded receivers comprise infrared or photodiode receivers.

9. A communication and identification apparatus comprising:

a first operator first optical interrogator configured to generate a first optical output at a first wavelength; comprising a first encoded waveform signal;

a second operator first optical audio transmitter (LEROAT) configured to receive said first optical output, said first LEROAT comprising a first multifunctional optical transceiver (MOT), an electronics module, a first headset with a first speaker and a first microphone, said first MOT comprises a plurality of first laser encoded receivers and a plurality of non-visible spectrum light emitting diodes (LEDs), wherein said first MOT is configured with control systems adapted for:

detecting said first encoded waveform signal;

triggering a first response after detection of said first encoded waveform signal by said first MOT comprising activating said first plurality of non-visible spectrum LEDs to respond with a first non-visible wavelength signal comprising an infrared or thermal warning signal;
detecting said first non-visible wavelength signal using a first optical imager by a first operator in a first line of sight of operating area of interest to receive said first non-visible wavelength signal; and
determining an identity of a second operator based on said detecting of said first non-visible wavelength signal by associating said first non-visible wavelength signal with a predetermined list of operator identities comprising a plurality of identifiers and one of an associated plurality of non-visible wavelength signals;
a first optical audio receiver (OAR) and a second headset, said first OAR configured to convert a second optical output to a first audio signal output, said second headset comprising a second speaker, said OAR comprises a control section adapted to:
detect said second optical output signal by said first OAR by said first operator; and
generate said first audio signal output through said second headset;
wherein said first LEROAT is further configured to respond with a first data signal after receipt of said first encoded waveform signal by said first MOT comprising generating text information comprising a warning data to said second operator, and transmitting said second optical output containing information including a second data signal to said first operator comprising said warning data.

10. An apparatus as in claim 9, wherein said first plurality of laser encoded receivers comprises infrared or photodiode receivers.

11. An apparatus for identifying and communicating comprising:
a first optical interrogator to a first operator configured to generate a first optical output at a first wavelength;
a first optical audio transmitter (LEROAT) to a second operator configured to receive said first optical output, said first LEROAT comprising a first multifunctional optical transceiver (MOT), an electronics module, a first headset with a first speaker and a first microphone, wherein said first MOT comprises a plurality of first laser encoded receivers and a plurality of non-visible spectrum light emitting diodes (LEDs), said first optical interrogator is configured for operating and orienting said first optical interrogator within a first line of sight operating area of interest by said first operator and illuminating said first MOT with a first encoded waveform signal, wherein said first MOT is configured for detecting said first encoded waveform signal, triggering a first response after detection of said first encoded waveform signal by said first MOT comprising activating said first plurality of non-visible spectrum LEDs to respond with a first non-visible wavelength signal comprising an infrared or thermal warning signal, detecting said first non-visible wavelength signal using a first optical imager by said first operator in said first line of sight of operating area of interest to receive said first non-visible wavelength signal; and
a first control section configured for determining an identity of said second operator based on said detecting of said first non-visible wavelength signal by associating said first non-visible wavelength signal with a predetermined list of operator identities comprising a plurality of identifiers and one of an associated plurality of non-visible wavelength signals.

12. An apparatus as in claim 11, wherein said plurality of first laser encoded receivers comprise infrared or photodiode receivers.

13. An apparatus as in claim 11, further comprising:
a first optical audio receiver (OAR) and a second headset to said first operator, said first OAR configured to convert a second optical output to a first audio signal output, said second headset comprising a second speaker, wherein said first operator dons said second headset to hear said first audio signal output,
wherein said optical interrogator is configured for operating and orienting said first optical interrogator within said first line of sight operating area of interest by said first operator and illuminating said first MOT with said first encoded waveform signal;
wherein first MOT is configured for detecting said first encoded waveform signal;
wherein said apparatus is configured for generating a second audio signal output comprising a first audio warning signal audible to said second operator on said first headset, and transmitting said second optical output signal to said first operator;
wherein said first OAR is configured for detecting said second optical output signal; and
wherein said first OAR is configured to generate said first audio signal through said second headset.

14. An apparatus as in claim 11, further comprising:
wherein said first optical interrogator is configured to generate said first optical output at said first wavelength;
a first optical audio receiver (OAR) and a second headset to said first operator, said first OAR configured to convert a second optical output to a first audio signal output, said second headset comprising a second speaker wherein said first operator dons said second headset to hear said first audio signal output from said second speaker, wherein said first headset is configured so as to generate output from said first headset;
wherein said first MOT and LEROAT with said second headset to said second operator are configured to receive said first optical output, wherein said second operator dons said second headset so as to be able to hear output from said second headset;
wherein said first optical interrogator is configured for operating and scanning said first line of sight operating area of interest by said first operator and illuminating said first MOT with said first encoded waveform signal on said second operator;
wherein said first MOT is configured for detecting said first encoded waveform signal;
wherein said first LEROAT is configured for triggering said first response after receipt of said first encoded waveform signal by said first MOT comprising activating said first LEROAT to respond with a first data signal that includes text information comprising a warning data to said second operator, and transmitting a second optical output containing information including a second data signal to said first operator wherein said second data signal comprises said warning data;
wherein said first OAR is configured for detecting said second optical output by said first operator; and
wherein said first OAR is configured to generate said second data signal to said first operator wherein said second data signal comprises said warning data;

wherein a display is configured to display said text information.

\* \* \* \* \*